United States Patent [19]

Callahan et al.

[11] Patent Number: 4,847,605
[45] Date of Patent: Jul. 11, 1989

[54] PICKING IN A GRAPHICS SYSTEM

[75] Inventors: Robert M. Callahan, Woodstock; Anthony M. Fiore, Kingston; Edward C. Flickinger, Saugerties; Bruce C. Hempel, Tivoli; Bruce E. Whistance, Kingston, all of N.Y.

[73] Assignee: International Business Machines Corporation, Armonk, N.Y.

[21] Appl. No.: 43,019

[22] Filed: Apr. 27, 1987

[51] Int. Cl.$^4$ .......................... G09G 1/00; G09G 1/16
[52] U.S. Cl. ..................................... 340/709; 340/706; 364/521
[58] Field of Search ................ 364/521; 340/707, 708, 340/709, 710, 706

[56] References Cited

U.S. PATENT DOCUMENTS

| 4,451,895 | 5/1984 | Sliwkowski | 340/708 |
|---|---|---|---|
| 4,578,766 | 3/1986 | Caddy | 364/521 |
| 4,587,520 | 5/1986 | Astle | 340/710 |
| 4,661,810 | 4/1987 | Himelstein | 340/710 |

OTHER PUBLICATIONS

Research Document No. 24801, Dec. 1984.

Primary Examiner—Gerald L. Brigance
Attorney, Agent, or Firm—Mark S. Walker; George E. Clark

[57] ABSTRACT

A method is described for improving the responsiveness and accuracy of a graphics system to user-initiated picking actions. In this method, the visual cueing and pick window positioning components of the graphics system tracking/picking function are temporarily separated at the time the user attempts to pick. By handling these two components of the tracking/picking function independently, both type 1 (failure to pick the desired item) and type 2 (picking an undesired item) errors are prevented. This translates into greater productivity for the graphics system user.

6 Claims, 5 Drawing Sheets

PICKING IN A GRAPHICS SYSTEM

BACKGROUND OF THE INVENTION

DESCRIPTION OF THE INVENTION

This invention relates to information display systems and more particularly, to interactive graphics workstations in which a user positions a tracking cursor in a graphics image by manipulating a tracking device (mouse, tablet, joystick, tracking ball, etc.) and then selects an item or screen position in the image by some action (usually a switch closure). A typical graphics workstation provides a tracking/picking function having the following 3 major components:

1. Positioning of a visual indicator (the cursor) on the screen in response to the user's movement of the tracking device;
2. Positioning of an invisible active area (pick window) used to select items drawn on the screen;
3. A signaling mechanism (the switch closure) used to notify the system that the user wishes to select the item currently under the cursor.

A pick occurs when the graphics processor draws an item that intersects the pick window when the switch is closed.

In the prior art, components one and two above are tied together, that is, the cursor and pick window positions are updated in unison so that they are always the same. Since the cursor must continually move to reflect the position of the tracking device, the graphics system continually moves the pick window so that it is at the position of the cursor. In this way, the pick window will normally be positioned on the item desired by the user when he presses the switch to cause a pick.

The rate at which the cursor and pick window are repositioned in response to the movement of the tracking device must be sufficiently great to ensure that the user perceives the motion of the cursor on the screen to be "smooth" (eye perception) and "responsive" (hand-eye perception). A minimum rate of about 25 times per second is required. For architectural considerations of a program running in a workstation, recognition of the switch closure may only occur at the beginning of each frame generation cycle, which is potentially a much lower rate. Since this is the case, the position of the pick window at the time the pick signal is recognized may be different than the position of the cursor at the time the signal was issued. If the user's movement of the tracking device is fast and the frame generation time is relatively long, this difference can be quite significant, resulting in the following two types of errors:

1. Type 1: The desired item is not picked; (See FIG. 1).
2. Type 2: An item that was not desired by the user is picked; (See FIG. 2).

The potential for these two types of errors reduces the user's productivity for the following reasons:

1. The user reduces the speed at which he works in an effort to prevent the occurrence of either type of error;
2. When a type 1 error does occur, the user must resignal his desire to pick;
3. When a type 2 error does occur, the user must correct the undesired pick as well as resignal his desire to pick.

Type 1 errors occur for one of the following two reasons:

1. The switch is closed and released (opened) before the next frame generation cycle begins. In this case, the closing of the switch is not detected.
2. In response to the movement of the tracking device after the switch has been closed, the pick window moves so that the desired graphic object no longer intersects the pick window (see FIG. 1).

Type 2 errors occur for the second of the above reasons, with the added condition that not only is the desired object not in the window, but an undesired object is in the window (see FIG. 2).

PRIOR ART

U.S. Pat. No. 4,451,895 teaches a computer aided design system which includes point and pick means for selecting a point and means to produce a display enabling point and pick selection of information.

Although the patent deals generally with picking of objects in a graphics display system, it does not teach nor suggest the present invention, which relates to separating pick requests from locator input and cursor tracking.

Research Document RD No. 248,001 dated Dec. 10, 1984, teaches a locator device for a graphic workstation in which a user is given an opportunity to visually verify that a correct selection has been made prior to entering the selection to avoid common selection errors. By defining selection as consisting of a point and pick cycle, and an explicit closure step, the user is allowed to repeat the point and pick cycle as often as desired, prior to committing the selection.

Although this generally relates to picking of graphic objects in the graphic display system and more specifically, to handling pick error conditions, the system disclosure in the Research Document appears to relate generally to the slow prior art method and does not teach nor suggest the method according to the present invention, which includes separating pick requests from locator input and cursor tracking.

SUMMARY OF THE INVENTION

It is, therefore, an object of the present invention to freeze the position of the pick window (component two) at the time of the user's signal, note the occurrence of the switch closure for use at the beginning of the next frame generation cycle, and continue to move the cursor (component one) in response to the movement of the tracking device. A graphic system must remain in this "frozen pick window" state until sufficient time has elapsed for the desired item to be redrawn. Thus the pick window must be kept stationary at the user's pick position until either the pick occurs or the next frame generation cycle completes. At that time, the graphic system returns to the normal mode in which the pick window position is continually moved in unison with the tracking cursor. Keeping the pick window stationary immediately after the user signals a pick ensures that the desired item will be picked, while continuing to move the cursor during this period allows the user to position the cursor for his next picking action. This method improves accuracy and productivity (See FIG. 3).

It is another object of the present invention to separate display cursor tracking from pick window positioning to ensure accurate picking of a primitive in a graphic display system. It is still a further object of the present invention to separate cursor tracking from pick window positioning as above by a method which permits pick requests to be queued and processed independently from operator locator and cursor tracking functions.

Accordingly, a method for separating cursor tracking from pick window location includes the steps of:

Determining whether a current tracking device position is equal to a previous tracking device position;

Saving a current tracking device position as a previous tracking device position and updating cursor position to the tracking device position if the current tracking device position is not equal to the previous tracking device position;

Testing for a "frozen pick window" flag if the current tracking device position had changed;

Updating the position of the pick window to the tracking device position if the current tracking device position had changed and the "frozen pick window" flag is not set;

Testing for a switch closure indicating a user initiated pick;

Testing for the "frozen pick window" flag if the switch closure is detected;

Setting a "frozen pick window" flag if the switch closure is detected and said "frozen pick window" flag is not set; and Detecting a switch overrun condition and then storing position data or signalling the user if the switch closure is detected and the frozen pick window flag is set.

It is an advantage of the present invention that the speed of use of the graphic display system will not be impaired by delays inherent in a pick recognition sequence.

The foregoing and other objects, features and advantages of the present invention will be apparent from the more particular description of the preferred embodiment of the invention as illustrated in the accompanying drawings.

DESCRIPTION OF THE PRIOR ART

In general, in a graphics display system, a pick occurs when the graphics processor draws an item that intersects a pick window during a frame creation cycle following a switch closure.

In the prior art, positioning of a visual indicator such as a cursor on the screen and positioning of an invisible active area to define a pick window used to select items drawn on the screen are functionally connected. That is, the cursor and the pick window positions are updated in unison so that they are always the same. Since the cursor must continually move to reflect the position of the tracking device, the graphic system moves the pick window so it is at the position of the cursor. In this way, the pick window is positioned on the item to be picked at the time the user closed the switch.

The rate at which the cursor and the pick window are repositioned in response to the movement of the tracking device must be sufficiently great to ensure that the user perceives the motion of the cursor on the screen to be smooth and responsive. Recognition of the switch closure in some prior art systems may occur only at the beginning of each frame generation cycle which is potentially a much lower than that required for perception of a smooth and responsive movement. In this case, the position of the pick window at the time the pick occurs may be different than the position of the cursor at the time the signal was issued. If the user's movement of the tracking device is relatively fast and the frame generation time is relatively long, this difference can be quite significant resulting in the following two types of errors:

Type 1 (shown in FIG. 1) in which the desired item is not picked;

Type 2 (shown in FIG. 2) in which an item in the display is picked which is not the item desired to be picked by the user.

Figure 1:
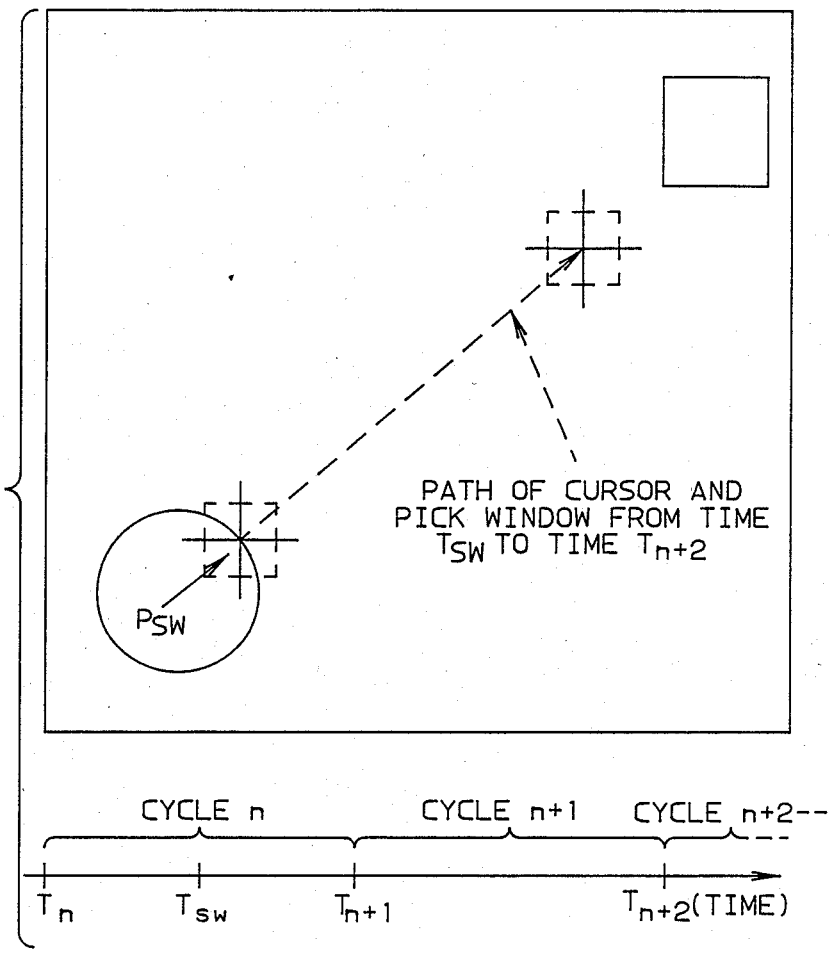
FIG. 1 is a schematic illustration of an error condition which can occur with prior art graphic primitive pick sequences.

In FIG. 1, it can be seen that because of the delay in recognizing switch closure, the pick window and the cursor have moved into an open area of the display screen and thus the circle which is the desired item to be picked is not picked by the graphic system.

Figure 2:
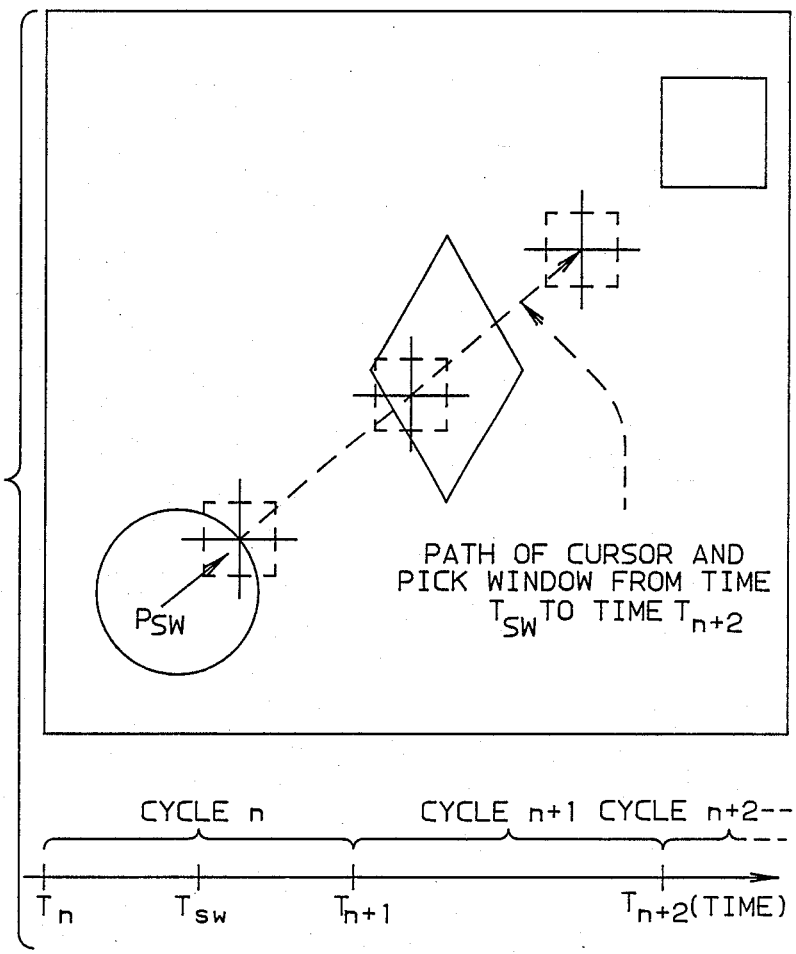
FIG. 2 is a schematic diagram of a second type of error which can occur in graphic display systems employing prior art primitive pick sequences.

As shown in FIG. 2, because the cursor and the pick window have moved between the time of switch closure and the time of the system recognition of the switch closure, the diamond in the center of the display screen has been selected for picking rather than the circle which was the desired object.

Thus, FIG. 1 represents a type 1 error as described and FIG. 2 represent a type 2 error as described.

The potential for these two types of errors reduces the user's productivity for the following reasons:

1. The user reduces the speed at which he or she works in an effort to prevent the occurrence of these errors;

2. When a type 1 error occurs, the user must resignal the pick;

3. When a type 2 error occurs, the user must correct the undesired pick as well as resignal the desired pick.

Type 1 errors occurs for one of the following two reasons:

1. The switch is closed and released (open) before the next frame generation cycle begins. In this case, the closing of the switch is essentially ignored.

2. The pick window moves in response to the movement of the tracking device after the switch has been closed so that the desired graphic object no longer intersects the pick window. (See FIG. 1).

Type 2 errors occur for the second of the above reasons, with the added condition that not only the desired object is not in the window but an undesired object may be in the pick window (See FIG. 2).

DESCRIPTION OF THE PREFERRED EMBODIMENT OF THE PRESENT INVENTION

Figure 3:
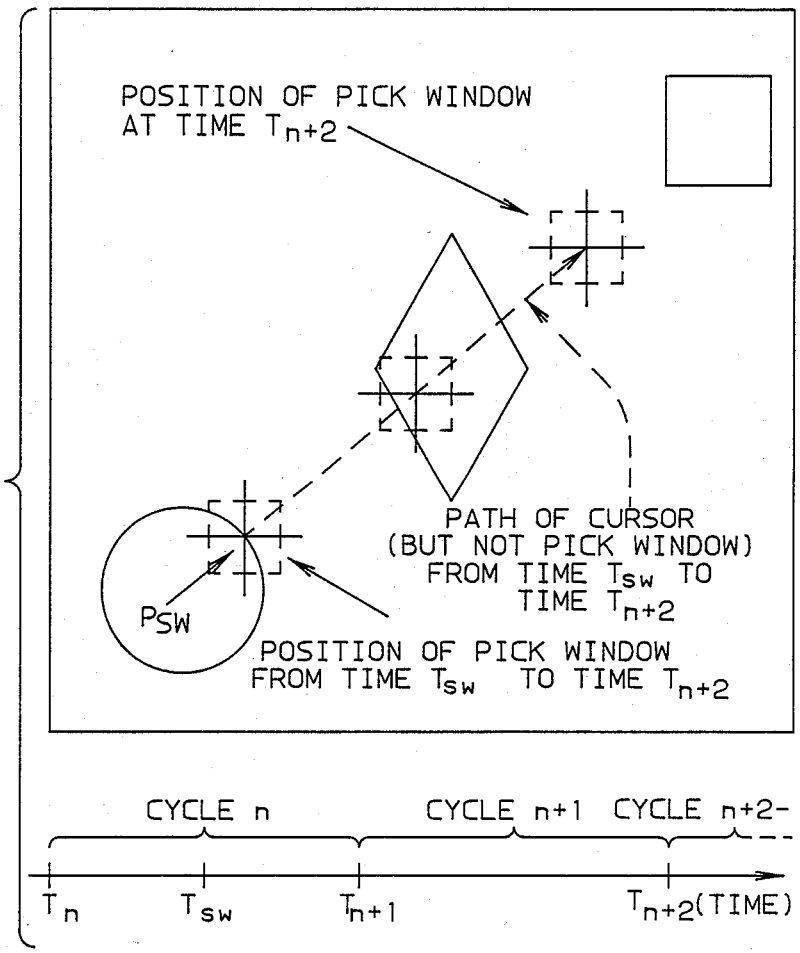
FIG. 3 is a graphic representation of the method according to the present invention in which the type 1 and type 2 errors identified with respect to FIGS. 1 and 2 are eliminated.

Referring now to FIG. 3, a solution to the above identified picking errors will be discussed with reference to a preferred embodiment of the presnt invention.

The user, desiring to pick a circle, closes the pick switch at time Tsw when the cursor and the pick window are at position Psw on th circle which the user desires to be picked. The pick window remains at position Psw, while the cursor is allowed to move as in the prior art methods. Since the pick window is still at position Psw during cycle n+1, the circle is picked as the user desired. At the start of cycle n+2, the pick window resumes moving with the cursor which is now moving towards the square at the upper right corner of the display.

Figure 4:
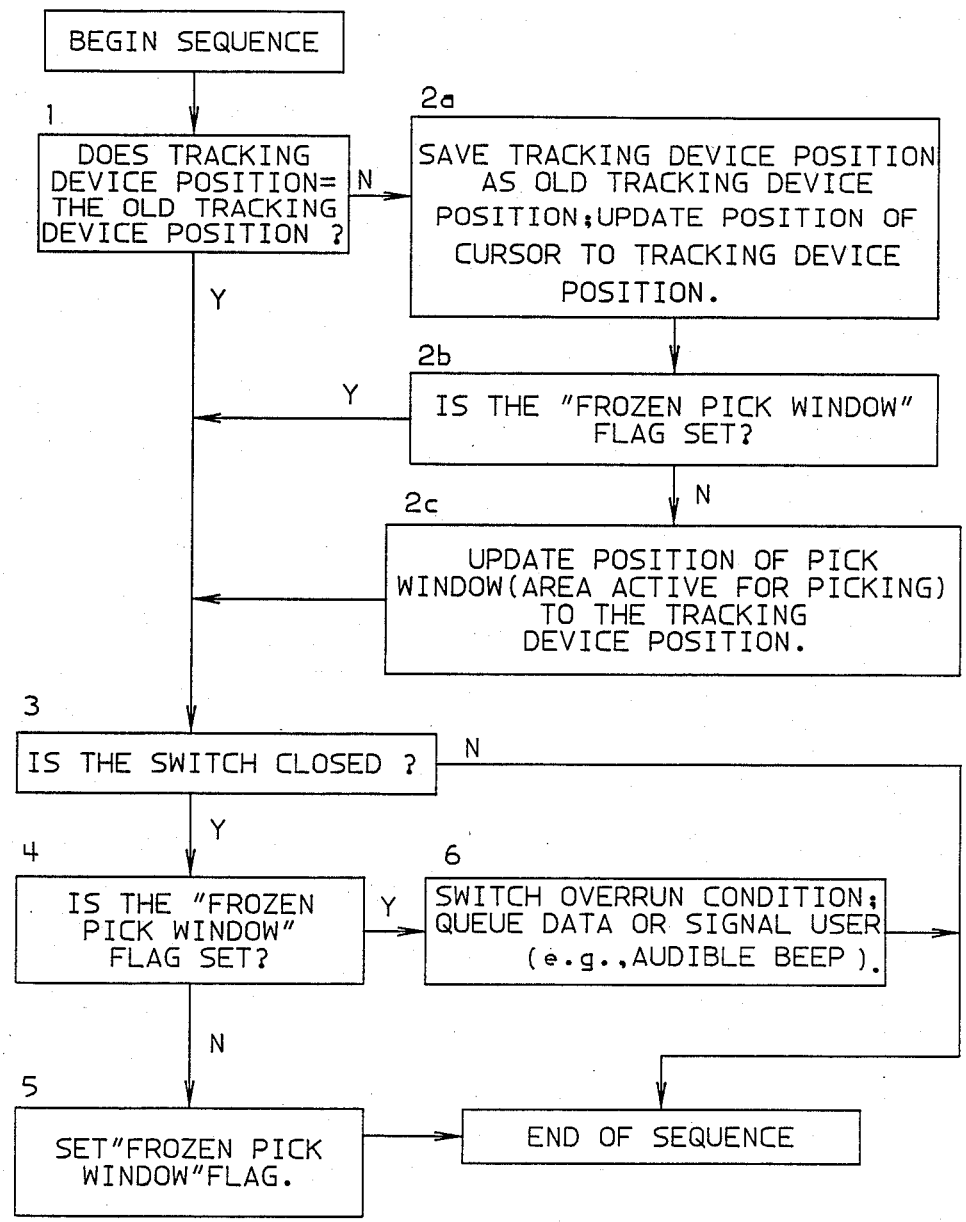
FIG. 4 is a flow chart showing the tracking device controller sequence in accordance with the present invention.
Figure 5:
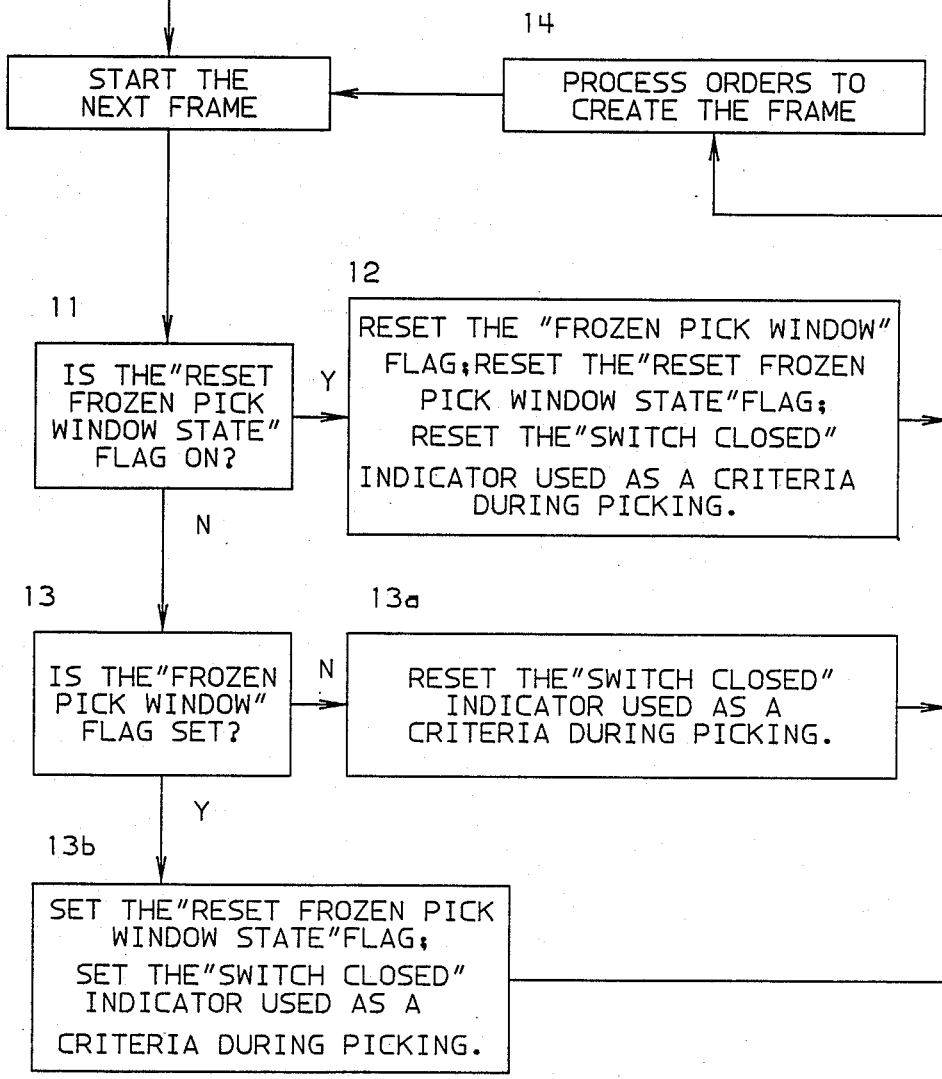
FIG. 5 is a flow chart showing the frame creating process in accordnce with the present invention.

Referring now to FIGS. 4 and 5, the control of the tracking device and the frame creation process in accordance with the preferred embodiment of the present invention will be described.

The tracking and picking functions of a typical graphics workstation are separate functions that run concurrently. This is due to the fact that tracking is a function of the manipulation of the tracking device, while picking is a function of the creation of the graphics frame.

FIG. 4 is a detailed flowchart of the way the tracking function would be implemented in the preferred embodiment of the present invention, while FIG. 5 is a detailed flowchart of the way the graphics frame creation function would be implemented with regard to picking in the preferrd embodiment of the present invention. these two flowcharts are integrally involved with each other, since they describe the way in which the tracking function and the graphics frame creation functions communicate with each other to implement the present invention's improved method of picking.

Three control flags are used in FIGS. 4 and 5. One of these, a "frozen pick window" flag, is used as a means of communication between the tracking control and frame creation processes, while the other two are used by the frame creation process to remember actions it must perform at later times. The descriptions of these three flags are as follows:

"frozen pick window" flag—This flag indicates whether the workstation is in the frozen pick window state in which the pick window ceases to move unitl the next pick occurs or one complete frame creation cycle finishes, whichever occurs first. If the flag is set, the workstation is in the frozen pick window state; if the flag is reset, the pick window moves in unison with the tracking cursor. This flag is set by the tracking control function when the switch closes and there is no outstanding unprocessed switch closure; it is reset by the frame creation process when a new frame begins after a pick has occurred or a complete frame creation cycle has finished since the switch closure caused the frozen pick window state to exist.

"reset frozen pick window state" flag—This flag indicates to the graphics frame creation function that it must resume moving the pick window in unison with the tracking cursor at the start of the next frame creation cycle. if this flag is set, the "frozen pick window" flag will be reset at the start of the next frame generation cycle, if the flag is reset, no such action will be performed at that time. The "reset frozen pick window state" flag is set by the frame creation process at the beginning of the first frame after the "frozen pick window" flag was set; the "reset frozen pick window state" is reset by the frame creation process at the beginning of a frame when it is set.

"switch closed" indicator—This indicator, which exists in the prior art implementations, is used by the graphics program execution function during the drawing process to determine whether the switch will be considered closed for the purpose of picking when objects are drawn. If this indicator is set, a pick will occur if an object is drawn through the pick window; if the indicator is not set, a pick will not occur when an object is drawn through the pick window. This indicator is set or reset by the frame creation process at the beginning of each frame based on the state of the "frozen pick window" flag (in prior art implementations, the "switch closed" indicator was set or reset by the frame creation process at the beginning of each frame based on the instantaneous state of the tracking device switch).

For each tracking device controller sequence (see FIG. 4), the following steps are performed in the order listed:

1. The position of the tracking device is tested to determine whether it is the same as the tracking device position that was stored last.

2. If the tracking device position is different than the position last stored, the following steps are performed:
   (a) The tracking device position is stored as the previous tracking device position and the position of the cursor is updated to the tracking device position.
   (b) The "frozen pick window" flag is tested.
   (c) If the "frozen pick window" flag is not set, the position of the pick window is also updated to the tracking device position.

3. The tracking device switch is tested to determine whether it is closed or open.

4. If the tracking device switch is closed, the "frozen pick window" flag is tested.

5. If the tracking device switch is closed and the "frozen pick window" flag is not set, the "frozen pick window" flag is set.

6. If the tracking device switch is closed and the "frozen pick window" flag is set, a switch overrun condition is considered to have occurred, and one of the following two actions is performed:
   (a) The data is saved on a queue for subsequent use when all previous switch closures have been processed.
   (b) A signal such as an audible beep is issued to inform the user of the workstation that a switch overrun condition has occurred.

At the beginning of each frame creation cycle (see FIG. 5), the following steps are performed in the order listed:

11. The "reset frozen pick window state" flag is tested.

12. If the "reset frozen pick window state" flag is set, the "frozen pick window" flag, the "reset frozen pick window state" flag, and the "switch closed" indicator used as a picking criterior are reset.

13. If the "reset frozen pick window state" flag is not set, the "frozen pick window" flag is tested and one of the following two steps is done:
   (a) If the "frozen pick window" flag is not set, the "switch closed" indicator used as a criterion during picking is reset,
   (b) If the "frozen pick window" flag is set, the "reset frozen pick window state" flag and the "switch closed" indicator used as a criterion during the picking are set.

14. The graphics orders to create the frame are then executed.

Thus, while the invention has been described with reference to a preferred embodiment thereof, it will be understood by those skilled in the art that various changes in form and detail may be made without departing from the spirit or scope of the invention.

What is claimed is:

1. A method of selecting or picking objects in response to an operator generated pick request, on a graphics workstation display having both a pick window and a cursor, where the cursor and pick window positions are both modified in response to the movement of a cursor tracking device, and where selecting or picking occurs at a rate slower than the rate of updating cursor position, said method comprising the steps of:

determining a position of said cursor tracking device;

testing for the existence of an operator generated pick request;

updating said pick request status indicator, if a pick request is detected;

repositioning said cursor to said position of said tracking device;

testing said pick request status indicator to determine whether outstanding pick requests exist;

maintaining said pick window position whenever outstanding pick requests exist;

repositioning said pick window to said position of said tracking device whenever there are no outstanding pick requests; and periodically re-executing a display program, testing each object against the pick window to determine whether a pick occurred, indicating a picked object, if a pick occurred, and updating said pick request status indicator.

2. The method of claim 1, wherein said step of updating said pick request status indicator comprises the steps of:

setting said pick request status indicator to indicate an outstanding pick request if a pick request is found and there are no outstanding pick requests;

declaring a pick request overrun condition if a pick request is found and outstanding pick requests exist.

3. The method of claim 2, wherein said declaring step comprises:

signalling a user if a pick request is found and outstanding pick requests exist.

4. The method of claim 2, wherein said declaring step comprises:

storing said position of said cursor tracking device and said pick request;

updating said pick request status indicator to reflect said stored request.

5. The method of claim 1, wherein the step of periodically re-executing a display program, indicating a picked object, if a pick occurred, and updating said pick request status indicator comprises the steps of:

testing for a third condition indicator;

resetting said pick request status indicator, a second pick request indicator, and said third condition indicator, if said third condition indicator is set;

testing said pick request status indicator to determine whether outstanding pick requests exist, if said third condition indicator is not set;

setting said third condition indicator and said second pick request indicator to indicate picking should occur during display program re-execution if outstanding pick requests exist;

resetting said second pick request indicator if there are no outstanding pick requests, and executing graphics orders necessary to create a frame and indicating a picked object if a pick occurred.

6. The method of claim 5, wherein said second pick request indicator is a latched function of said first pick request indicator.

* * * * *